Nov. 4, 1924.  1,513,759
S. L. MARPLE
AUTOMATIC FEED WATER REGULATOR
Filed July 11, 1923  2 Sheets-Sheet 2
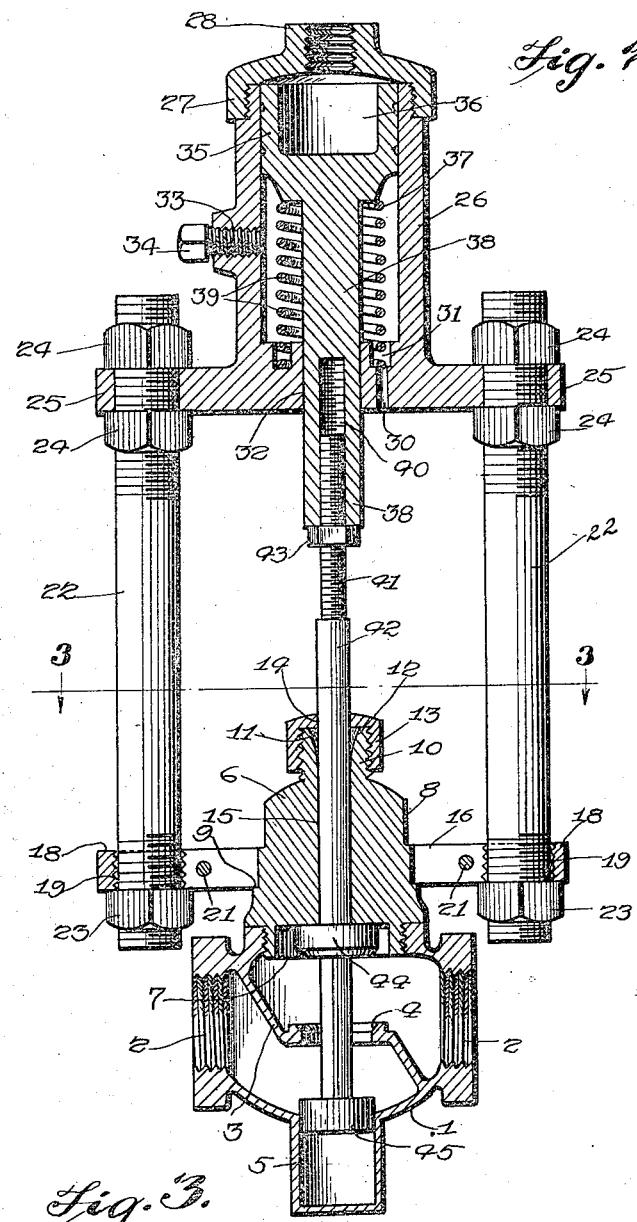

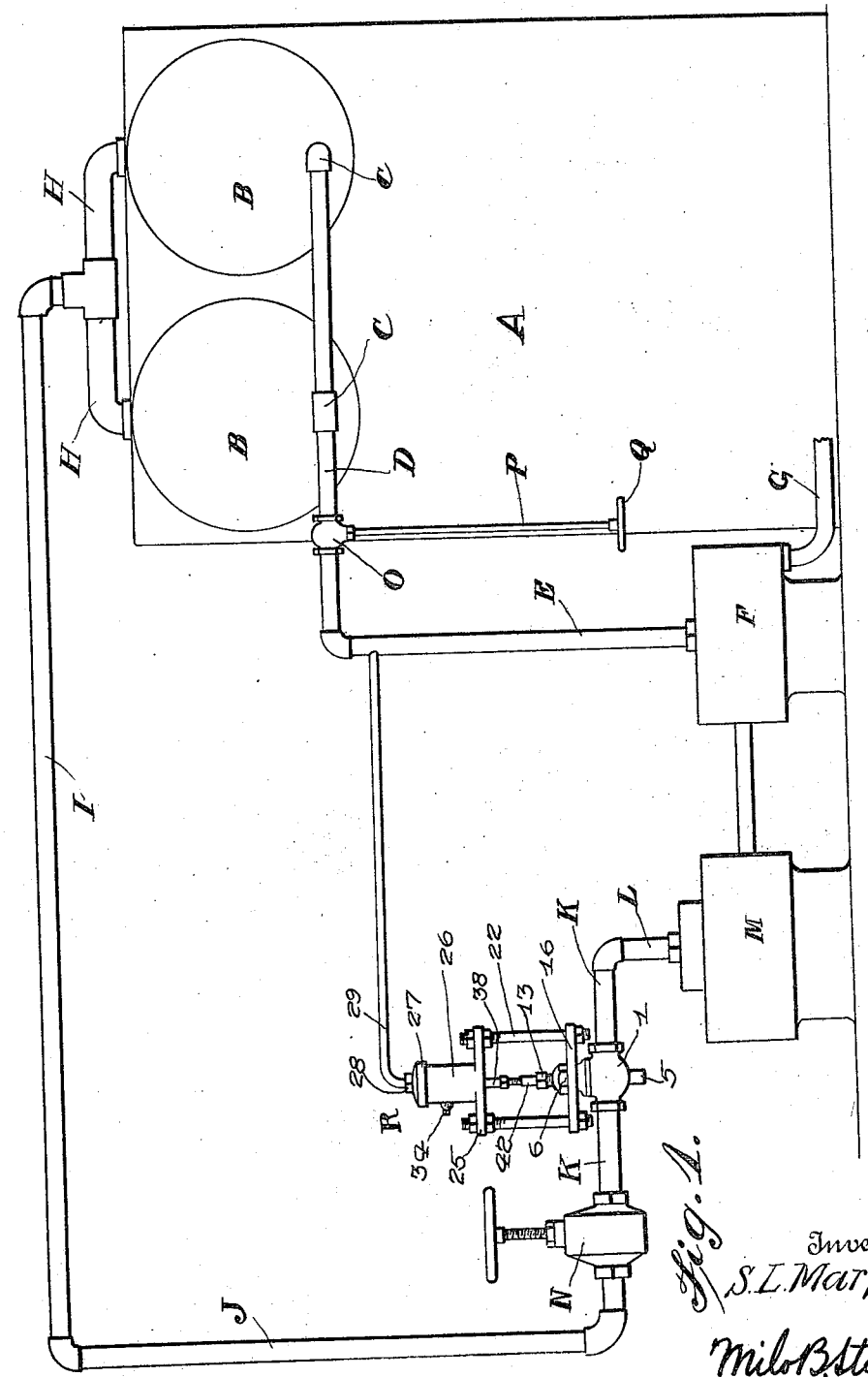

Patented Nov. 4, 1924.

1,513,759

UNITED STATES PATENT OFFICE.

SAMUEL L. MARPLE, OF PHILADELPHIA, PENNSYLVANIA.

AUTOMATIC FEED-WATER REGULATOR.

Application filed July 11, 1923. Serial No. 650,923.

*To all whom it may concern:*

Be it known that I, SAMUEL L. MARPLE, a citizen of the United States, residing at Philadelphia, in the county of Philadelphia and State of Pennsylvania, have invented new and useful Improvements in Automatic Feed-Water Regulators, of which the following is a specification.

This invention relates to an automatic feed water regulator for steam boilers and has for one of its objects the provision of means to automatically start a steam operated water pump when the boilers require an additional supply of water and also to automatically stop the pump when the boilers have been supplied with a sufficient amount of water.

Another object of this invention is to provide the feed water pipe in proximity to the boilers with a manually operable valve adapted to be operated by a boiler tender for causing the actuation of the automatic regulator.

A further object of the invention is to provide the regulator with a connection between the same and the water pipe for conducting the back water pressure occurring in the feed water pipe to the regulator for stopping the pump.

A still further object of the invention is to provide the regulator with means for normally maintaining the same in open position until closed by the introduction of back water pressure therein.

Another object of the invention is to provide the regulator with an air cushioning device to prevent the too rapid movements of the valve and its actuating members to avoid hammering and the consequent danger of breakage.

Another object of the invention is to provide the regulator with means to adjust the same in accordance with the amount of water and steam pressure required in a given case.

A still further object of the invention is to provide the steam pipe with a manually operable valve between the boilers and the regulator, preferably in proximity to the latter, and which valve is designed to remain in normal open position until it is desired to close the same for any purpose.

An additional object of the invention is to provide a device of this character which is simple in construction, efficient in operation, easily disassembled for repairs and re-assembled, cheap to manufacture and which is capable of being readily installed in a boiler feed water supply system.

These and other objects will more fully appear and the nature of the invention will be more clearly understood as described in the following specification, defined in the appended claims and illustrated in the accompanying drawings, in which:

Figure 1 is a view in elevation, showing the application of the invention to a boiler feed water system;

Fig. 2 is a vertical sectional view through the regulator employed, showing the detailed construction thereof, and Figure 3 is a horizontal section view on line 3—3 of Fig. 2, looking in the direction of the arrows, showing the means employed for mounting the upper portion of the regulator upon the lower portion thereof.

Referring to the drawings, A indicates a steam boiler and B, B, the water and steam drums thereof. The lower portions of the drums B, B, are connected by the branch water pipes C, C, to a horizontal main water line pipe D provided at one end with the vertical water line pipe E connecting the pipe D with the water pump F provided with the suction pipe G connected to any suitable source of water supply. The upper portions of the drums B, B, are connected by the branch steam pipes H, H, to one end of a horizontal main steam pipe I connected at its opposite end to a vertical steam pipe J having its lower end connected to one end of a lower horizontal steam pipe K connected at its opposite end by the pipe L to the steam chest of the pump engine M. The above mentioned steam pipes convey the steam from the drums B, B, to the pump engine M and for controlling the steam to the pump engine M, the pipe K is provided with the manually operable valve N. The main water line pipe D is provided with a water controlling valve O located in the pipe D between the water pipe E and the first branch water pipe C, the valve O being manually operated by its valve steam P rotated by a hand wheel Q.

Interposed in the steam pipe K between the valve N and the steam pump M is an automatic regulator R shown in full detail in Figs. 2 and 3 and comprises a valve barrel 1 provided with oppositely disposed internally screw-threaded ends 2 in which are secured the contiguous threaded ends of the divided steam pipe K. The valve barrel 1 is provided with a substantially oblique partition wall 3 having a valve seat 4 arranged therein. Formed integrally with the valve barrel 1 at its under side and depending for a distance there-below is an air cushion chamber or pocket 5. Threaded in and seated upon the upper side of the valve barrel 1 is a guide and supporting block 6 provided with a valve housing or pocket 7 formed centrally in the bottom thereof. The block 6 is formed with a hexagonal nut shaped portion 8 to receive a wrench or the like to secure the block 6 upon the barrel 1 and is also provided with an annular seat 9. At the upper end of the block 6 is a threaded neck 10 provided with an internal annular recess 11 formed with an upwardly divergent surrounding wall and adapted to receive any suitable rod packing 12 which is retained in the recess 11 by the screw-threaded cap 13 provided with a central opening 14, the block 8 being further provided with a central guide opening 15 extending upwardly therethrough from the valve housing 7 to the recess 11 and registering with the opening 14 in the cap 13.

Secured upon the block 6 is a yoke 16 having a central opening 17 adapted to embrace the block 6 and rest upon the seat 9 thereof. The yoke 16 is provided with two oppositely extending arms 18 provided with screw-threaded openings 19 adjacent their outer ends, the yoke 16 being further provided with the slots 20 extending from opposite sides of the opening 17 to the respective screw-threaded openings 19 of the arms 18 whereby to provide resiliency to the yoke 16 to facilitate the mounting of the yoke upon the supporting block 6, the yoke 16 being subsequently caused to firmly grip the block 6 through the medium of the screw-bolts 21 designed to draw together the divided portions of the yoke 16.

Mounted in the threaded openings 19 of the yoke 16 are the lower threaded ends of the supporting rods 22 which are prevented from rotation in the openings 19 by the locking nuts 23 upon the projecting ends of the rods 22. Upon the upper threaded ends of the rods 22 are the vertically spaced nuts 24, between which are adjustably retained and supported by the upper threaded ends of the rods 22 the apertured arms 25 of the water pressure cylinder 26 provided with a screw-threaded cap 27 at its upper end, the cap 27 being provided with an internally threaded boss 28 to which is secured one end of the back water pressure pipe 29 connecting the cylinder 26 with the vertical water line pipe E.

The cylinder 26 has formed through its bottom a vent or drain opening 30 leading from a circular recess 31 formed in the upper side of the bottom of the cylinder 26 and surrounding a central opening or bearing 32 formed through the bottom of the cylinder 26. Formed through the side wall of the cylinder 26 is a threaded lubricating opening 33 having a threaded plug 34 inserted therein which is adapted to be removed for the purpose of injecting a lubricant through the opening 33 to lubricate the inner parts of the cylinder 26 and the plug 34 re-inserted or in lieu of the plug 34 any form of a lubricating device may be secured in the opening 33.

Operating within the cylinder 26 is a piston 35 having formed in its upper portion an enlarged cup 36 and at its bottom an annular shoulder 37 surrounding a stem 38 extending from the piston 35 downwardly through the bearing or opening 32 formed in the bottom of the cylinder 26 and projecting for a distance there-beyond. Surrounding the stem 38 within the cylinder 26 with one end seated in the recess 30 and its other end bearing against the shoulder 37 of the piston 35 is a compression spring 39 for normally forcing the piston 35 upwardly within the upper portion of the cylinder 26.

Within the lower end of the stem 38 is formed an elongated screw-threaded bore 40 being adjustably connected to the screw-threaded upper end 41 of a valve stem 42, which is retained in adjusted position relative to the bore 40 by the lock nut 43. The valve stem 42 is slidably mounted through the cap 13, the packing 11 and the guide opening 15 of the block 6 and upon the portion of the valve stem 42 below the block 6 is a valve 44 adapted to be seated upon the valve seat 4, the lower end of the valve stem 42 being provided with a piston head 45 for snugly reciprocating within the air chamber 5 to prevent too sudden movement of the valve 44 and its operating accessories in either direction, for as the piston head 45 of the valve stem 42 is drawn upwardly, there is a tendency to create a vacuum in the chamber 5 and the air which is retarded in its passage around the piston head 45 being slow to fill the partial vacuum beneath the head 45 causes the valve 44 and its accessories to move upwardly with only normal rapidity, the downward movement of the valve 44 and its operating accessories being likewise retarded by the air beneath the piston head 45 being compressed within the chamber 5 and restricted in its escape around the head 45.

The operation of the invention will be briefly described as follows:

Assuming the boiler A to be in operation with its drums B, B, containing a normal supply of water, the steam valve N in normal open position, the water valve O closed and sufficient back water pressure in pipe 29 to hold piston 35 downward against compression spring 39 thereby holding valve 44 closed upon its seat 4 and pump F and its engine M at rest, should the water in the boiler or boilers fall sufficiently below the normal water level as to require replenishing, the boiler tender will open the water valve O which releases the back water pressure in pipe 29 and upon piston 35 in cylinder 26 and the spring 39 will now force piston 35 upwardly thereby lifting valve 44 from its seat 4 allowing steam to pass through pipes K and L to start the engine M and pump F, whereby water will be pumped in the boiler drums B, B, through pipe E past valve O in pipe D and on to the drums. When the water in the boiler reaches the desired level the boiler tender now closes valve O whereby the continued operation of the pump for a short period will compress the water in pipe E against the closed valve O thereby causing a back pressure of water in pipe 29 and against piston 35 sufficiently to overcome spring 39 and force valve 44 upon its seat 4 to thereby stop the engine and pump and without the necessity of the boiler tender closing the manually operated valve N which may be at a distance remote from the boiler thus rendering my invention automatic in its application and operation.

Whilst I have illustrated and described my invention as adapted for automatically supplying feed water to a steam boiler or a plurality of boilers, I desire to state that the invention is equally adaptable for regulating the supply of any other fluid than water, such as air, oil and the like, and I may resort to such alterations and variations in the construction of this invention as are deemed expedient without departing from the spirit of the invention or the scope of the claims.

As illustrated in Fig. 2 the cylinder 26 is adjustable on the supporting rods 22 and consequently the position of the cylinder with reference to the piston and the spring therein may be varied. By varying the position of the cylinder with reference to the piston and the spring the tension of the spring is varied and this of course varies the responsiveness of the regulator. Attention is especially directed to the fact that the tension of the spring 37 may be varied by the adjustment of the cylinder 26 on the rod 22.

Having thus described my invention, what I claim as new and desire to secure by Letters Patent is:

1. A regulator of the class described comprising a casing having a seat, a support carried by the casing, rods carried by said support, a cylindrer carried by said rods and having one end partly closed, a piston in said cylinder and having a stem, a valve carried by said stem and adapted for contacting with said seat, and a coil spring housed entirely within said cylinder and confined between said piston and said partly closed end of the cylinder, the connection of said cylinder with said rods being adjustable whereby the position of said cylinder with respect to said piston and the spring in said cylinder may be varied, for varying the tension of the spring.

2. A regulator of the class described comprising a casing having a seat, a support carried by the casing, rods carried by said support, a cylinder carried by said rods and having one end partly closed, a piston in said cylinder and having a stem, a valve carried by said stem and adapted for contacting with said seat, a coil spring housed entirely within said cylinder and confined between said piston and said partly closed end of the cylinder, the connection of said cylinder with said rods being adjustable whereby the position of said cylinder with respect to said piston and the spring in said cylinder may be varied, and means to cushion the action of the valve.

3. A regulator of the class described comprising a valve casing having a valve seat and a cushion chamber in line with the valve seat, a yoke carried by the casing and oppositely directed arms, rods adjustably connected at their lower ends to said arms, a cylinder having oppositely located arms adjustably connected to said rods whereby the position of the cylinder may be varied, a piston in said cylinder and having a valve adapted for contacting with said seat, a cap applied to said cylinder and having means whereby the same may be connected to the water feed member of the boiler, and a spring confined between said piston and the lower end of said cylinder and being housed entirely within said cylinder, the lower portion of said stem being formed with a piston operating in said cushioning chamber to cushion the action of said valve.

In testimony whereof I affix my signature.

SAMUEL L. MARPLE.